(No Model.)
J. COLLINGE.
LAMP BURNER.
No. 578,036. Patented Mar. 2, 1897.
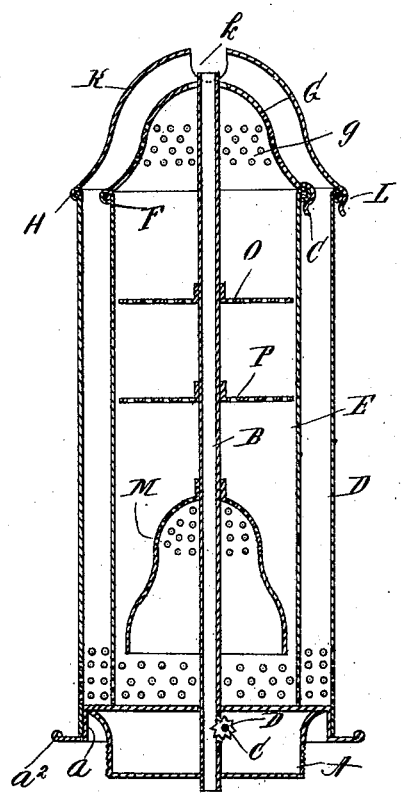
WITNESSES
John Buckler,
L. M. Muller.
INVENTOR
James Collinge,
BY
Edgar Tate
ATTORNEYS

UNITED STATES PATENT OFFICE.

JAMES COLLINGE, OF PRESTON, ENGLAND.

LAMP-BURNER.

SPECIFICATION forming part of Letters Patent No. 578,036, dated March 2, 1897.

Application filed August 5, 1896. Serial No. 601,753. (No model.)

*To all whom it may concern:*

Be it known that I, JAMES COLLINGE, a subject of the Queen of Great Britain, and a resident of Preston, in the county of Lancaster, England, have invented certain new and useful Improvements in Lamp-Burners, of which the following is a specification, reference being had to the accompanying drawing, forming a part thereof, in which similar letters of reference indicate corresponding parts.

This invention relates to lamp-burners, and the object thereof is to provide an improved device of this class which is adapted to be connected with any desired form of reservoir and which is so constructed as to prevent the heat which is generated by the burner from passing into the reservoir and to induce a continuous current of heated air through the burner-cone.

The invention is fully disclosed in the following specification, of which the accompanying drawing forms a part, said drawing being a central vertical section of a burner involving my invention.

In the practice of my invention I construct a burner which comprises a button or base A, which is cylindrical in form and provided with a screw-thread, by which it may be connected with the reservoir of a lamp, and said base is closed at its top and bottom, and passing vertically therethrough is a wick-tube B, and passing through the base A is a shaft C, on which is mounted a ratchet-wheel D, by which the wick, which is not shown, may be raised and lowered.

The base A is larger at its top than at its bottom, and the top thereof is provided with a depending annular flange or rim $a$, at the bottom of which is an outwardly-directed annular flange $a^2$, and connected with said depending annular rim or flange $a$ is a vertical tubular casing D, which is perforated at its lower end, and arranged in the casing D, and concentrically thereof, is a similar vertical casing E, the lower end of which is also perforated.

The casings D and E are of equal height, and mounted on the inner casing E or hinged to one side thereof at F is a burner-cone G, having a flame-slot in the top thereof through which the wick-tube projects, and said burner-cone is perforated, as shown at $g$, and hinged to the outer casing D at H is another and similar cone K, which is also provided with a flame-slot $k$, and each of said cones are adapted to be held in place by spring-catches L, which operate in connection with the sides of the casings D and E opposite the sides to which said cones are hinged.

Connected with the wick-tube or mounted thereon is a perforated cone M, the base of which is preferably directed downwardly, and secured to said wick-tube above said perforated cone are two perforated partition-plates O and P.

The air passes in through the perforations in the bottom of the casings D and E and passes up between said casings and also up through the inner casing E, the currents of air being broken and arrested and heated by the perforated cone M and the perforated plates O and P. The distance between the cones G and K and the base A is such that the air in its upward passage extracts the heat from the wick-tube and the parts connected therewith and is heated before it reaches the burner-cone, while the heat is prevented from passing into the reservoir.

The casings D and E and the cone M may be perforated throughout their lengths, if desired, and a burner constructed as herein described will not transmit or conduct heat to the reservoir of the lamp and will burn without the aid of a chimney.

My improved burner may be connected with any desired form of lamp or lantern, and it will be understood that a suitable chimney may be connected therewith and, Having fully described my invention, I claim as new and desire to secure by Letters Patent—

The combination with a lamp of the herein-described burner consisting of two vertical tubular casings, one adapted to be placed within the other, and each provided with openings or perforations in its lower side, a wick-tube passing through the base and upwardly through the inner casing, a burner-cone hinged to the top of each casing, and provided with flame-slots and means for retarding the flow of the air through the central tubular casing and for heating the same, consisting of perforated air-distributers, said base being provided with a wick-adjuster, and the cone within the inner tubular casing being perforated near the top thereof, substantially as shown and described.

In testimony that I claim the foregoing as my invention I have signed my name, in presence of the subscribing witnesses, this 18th day of July, 1896.

JAMES COLLINGE.

Witnesses:
ALFRED WALSH,
SAMUEL GODDARD.